Figure 1:
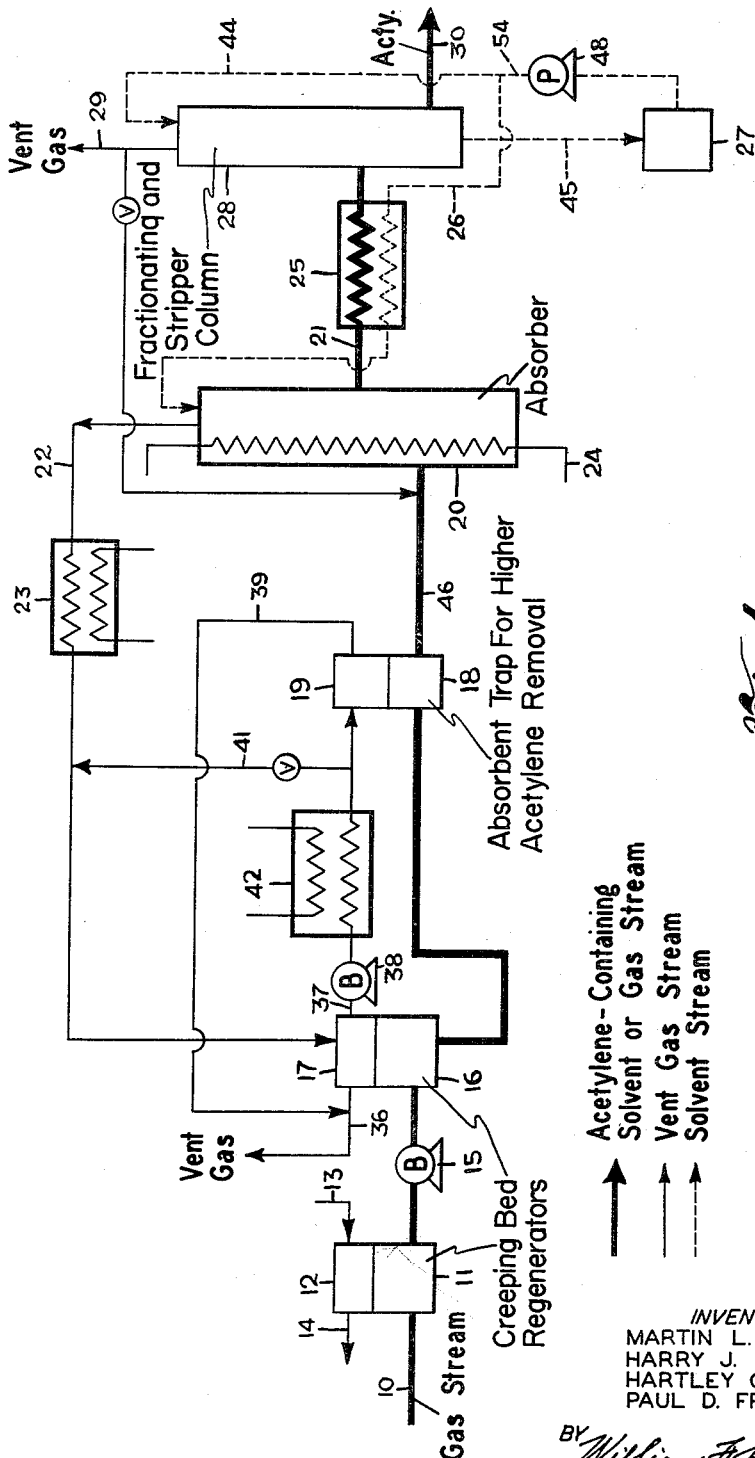

INVENTORS
MARTIN L. KASBOHM
HARRY J. PORTZER
HARTLEY C. DELLINGER
PAUL D. FRANSON

BY *William F. Mesinger*
ATTORNEY

March 23, 1965  M. L. KASBOHM ETAL  3,174,292
ACETYLENE RECOVERY PROCESS
Filed May 27, 1960  3 Sheets-Sheet 2

INVENTORS
MARTIN L. KASBOHM
HARRY J. PORTZER
HARTLEY C. DELLINGER
PAUL D. FRANSON
BY William F. Messinger
ATTORNEY March 23, 1965  M. L. KASBOHM ETAL  3,174,292
ACETYLENE RECOVERY PROCESS
Filed May 27, 1960  3 Sheets-Sheet 3

Creeping Pebble Bed Regenerators

Absorption Traps

INVENTORS
MARTIN L. KASBOHN
HARRY J. PORTZER
HARTLEY C. DELLINGER
PAUL D. FRANSON

BY William F. Mesinger
ATTORNEY

United States Patent Office 3,174,292
Patented Mar. 23, 1965

3,174,292
ACETYLENE RECOVERY PROCESS
Martin L. Kasbohm and Harry J. Portzer, Buffalo, and Hartley C. Dellinger, Tonawanda, N.Y., and Paul D. Franson, St. Albans, W. Va., assignors to Union Carbide Corporation, a corporation of New York
Filed May 27, 1960, Ser. No. 32,266
11 Claims. (Cl. 62—12)

This invention relates to a relatively low pressure-low temperature system for separating and recovering acetylene from an acetylene-containing gas stream.

Heretofore, acetylene recovery systems have generally operated at relatively high pressures, such as up to 4 to 13 atmospheres or higher, in order to raise the partial pressure of the acetylene in the gas stream and thus improve the efficiency of the recovery system. This has required a considerable investment in compressors. Even when low separation temperatures in the order of −50° C. (−58° F.) have been used, high pressures have still been employed to maintain higher acetylene partial pressures. High pressures were particularly thought to be necessary when the acetylene content of the gas stream was less than about 10 volume percent.

It is an object of the present invention to provide an efficient relatively low pressure-low temperature process for recovering acetylene from acetylene-containing gas streams.

It is a further object of this invention to provide a separation system which will economically recover acetylene from a gas stream wherein the volume percent of acetylene is very low.

A still further object of the invention is to provide an acetylene recovery system wherein plant investment costs are relatively small because of the relatively low pressure and other features of the process.

In general, the novel process of this invention employs the steps of progressively cooling a gas stream containing acetylene to a relatively low temperature to remove condensable impurities therefrom, removing some higher acetylene impurities in a separate step, contacting the resultant purified gas stream with a solvent which selectively absorbs acetylene and thereby separates the acetylene from less soluble impurities in the gas stream, and recovering the acetylene from the solvent. The cooling may be conveniently carried out by passing the gas stream in countercurrent heat exchange through one or more self-cleaning heat exchange zones. Such heat exchange zones may be provided, for example, by reversing heat exchangers or regenerative heat exchangers. Pebble bed regenerative heat exchangers are preferred.

More particularly, the novel process of this invention employs the steps of cooling gas streams containing acetylene and other materials to room temperature, preferably in a creeping pebble-bed regenerator, to remove carbon and tars; passing the cooled gases through a blower to increase the pressure to slightly above atmospheric; cooling the gases to a relatively low temperature, preferably in another creeping pebble-bed regenerator, to remove condensable materials; passing the cold gases through an adsorption trap to remove final amounts of condensable materials and some higher acetylenes; passing the cleaned, acetylene-containing gases through a cold solvent adsorption system to dissolve acetylene; passing the solution through a stripping column to remove materials less soluble than acetylene; then separating the acetylene from the solvent.

Figure 2:
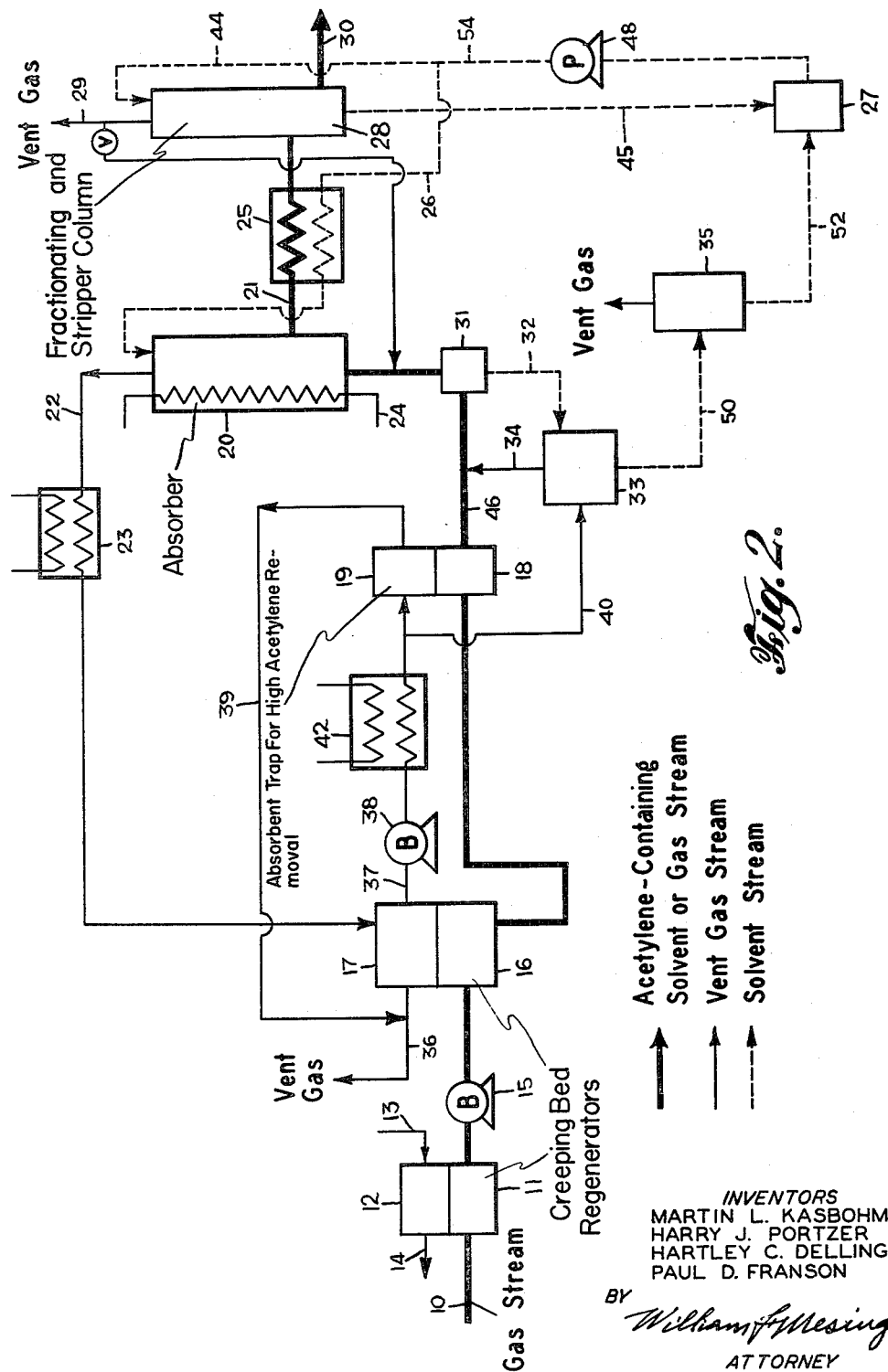
Figure 3:
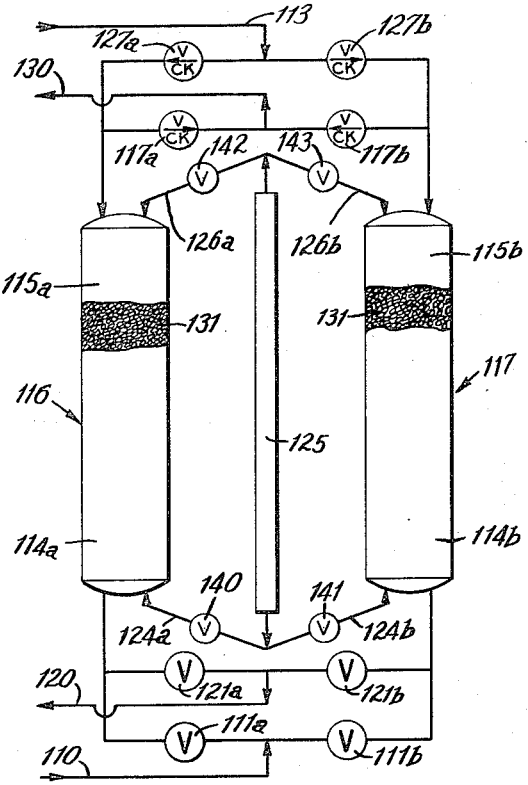
Figure 4:
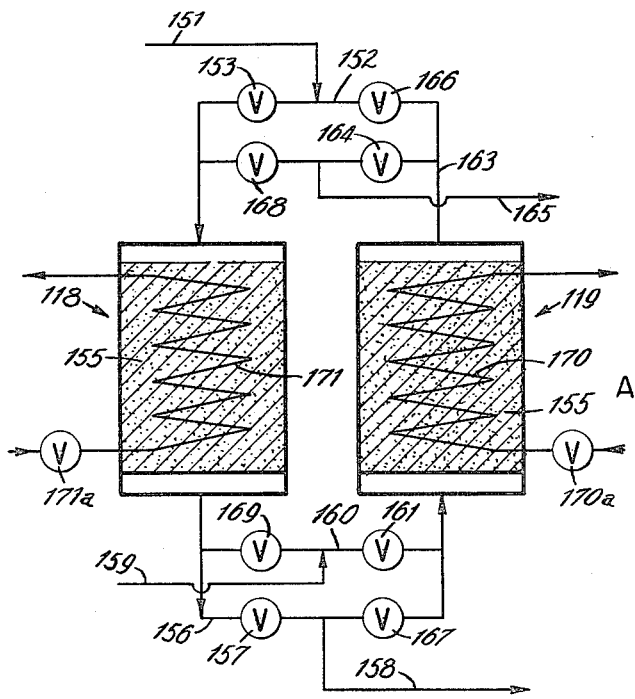

In the drawings:
FIGURE 1 is a diagrammatic representation of one embodiment of the process of this invention;
FIGURE 2 is a diagrammatic representation of a second embodiment of the process of this invention;
FIG. 3 is a schematic flow diagram of a pebble-packed creeping bed regenerator; and
FIG. 4 is a schematic flow diagram of a pair of adsorption traps which may be operated in accordance with this invention.

Referring more specifically to FIGURE 1, an acetylene-containing product gas is introduced into the recovery apparatus through line 10. The process is particularly useful when this acetylene-containing gas stream comes from a hydrocarbon cracking process such as a partial oxidation; pyrolysis, or regenerative furnace cracking process. The product gas stream is cooled to about room temperature by heat exchange with a process gas stream, such as air, in creeping pebble-rod regenerative heat exchanger 11. The creeping pebble-bed regenerators are operated in a pair with one exchanger 12 being cooled by exchange with process gas from line 13 while the other exchanger 11 is cooling the cracked gas stream. These regenerators also serve to clean carbon and tars from the cracked gas stream. Regenerators 11 and 12 are called "hot" regenerators since they operate at room temperature and above.

The construction and operation of the creeping pebble-bed regenerators preferably employed in the process of this invention are described in more detail in copending application Serial No. 776,549, filed November 26, 1958, now U.S. Patent 3,023,836.

The hot regenerator is preferably operated in such fashion that the temperature of the pebbles at the hot end (gas inlet) is high enough to burn off or vaporize carbonaceous materials which have been deposited on the pebbles. There is also a slow moving of the pebbles through the regenerator from the cold end to the warm end. In this fashion material deposited on the pebbles in the cooler region of the regenerator is slowly moved toward the warm end where it will be either vaporized and removed by the purge gas stream or burned off to provide self-cleaning operation. For a regenerator having a heat exchange bed used for processing 12,200 standard cubic feet per hour (s.c.f.h.) of gas containing 5 volume percent acetylene, a pebble flow rate of about 100 pounds per hour has been found satisfactory. A separate burner could alternatively be used to burn off pebble deposits. The cold end (gas outlet) is kept as cool as possible to lower power requirements of a subsequent blower 15 and to condense as much as possible of the contaminants from the gas stream. This desired cold end condition is obtained by using sufficient process gas or air on the regenerative cycle so that the outlet temperature of the cracked gas is approximately the same as the inlet temperature of the process gas or air. The warm purge gas from the hot regenerator in line 14 may then be used in any desired way or discarded. If air is used for heat exchange, the resulting warm process air could be used in the combustion cycle of a regenerative cracking furnace to maintain proper heat balance in the furnace or as oxidant for a partial oxidation burner.

While the slow movement of pebbles in the hot regenerator from cold to warm end is preferable in most cases, situations where the quantity of condensed materials is sufficiently large to disrupt pebble flow may best be handled by flow of pebbles in the opposite direction from warm to cold end. In this situation the pebbles would not be internally self-cleaned, but the outlet gas will still be clean due to condensation of most contaminants on the cold pebbles. The pebbles may then be cleaned externally to the regenerator by treatment in a furnace to vaporize or burn off carbonaceous deposits.

While the preferred process modification is to use the creeping-bed regenerators to cool the acetylene-containing gas stream to about room temperature, it should be understood that other means, such as water towers or other types of heat exchangers, could also be used to achieve the same result and still be within the scope of this invention.

The cooled gas stream from the pebble-bed regenerator at about room temperature and atmospheric pressure is then compressed to a pressure less than about 3 atmospheres absolute in a blower 15 and passed preferably into a set of creeping pebble-bed cold regenerators 16 and 17 operated cyclically in a pair, where the gas stream is cooled to about −120° F. to −160° F. These regenerators are called "cold" regenerators because they operate below room temperature. These cold regenerators are similar in construction and operation to the hot regenerators described hereinabove. The use of such regenerators with their low cost heat exchange surface permits a high thermal efficiency in the recovery of refrigeration and provides a self-cleaning heat exchange system for continuous operation. The minimum operating temperature is determined by the point at which acetylene begins to condense. This point would be determined by the pressure used in this stage. The optimum cold end temperature is determined by an economic balance between equipment, investment and operating costs. In these cold regenerators heat exchange is obtained between the acetylene-containing gas stream and vent gas from the subsequent separation system. This cooling of the gas stream also removes heat of compression introduced by blower 15. These regenerators can further clean the gas stream by freezing out at this stage additional condensable material, such as diacetylene, if desired.

In one embodiment of the present process, the temperature of the gases at the outlet of the cold regenerator is kept in the range −150° F. to −160° F. at 10 pounds per square inch gauge pressure to freeze out substantially all of the diacetylene. Since the temperature of the cold gas entering the heat exchanger is fixed by the operating conditions of the separation cycle, the control of the outlet temperature of the gases from the cold regenerator is accomplished by varying the rate of pebble flow from the cool end to the warm end of the regenerator. With respect to the total heat exchange, the flow of pebbles adds to the flow of cold vent gas to give a control over the overall flow of cold heat exchange material. When a subsequent step, such as an adsorbent bed, is used to remove substantially all of the higher acetylenes, such as diacetylene, the cold regenerators may be operated at −120° F. to −130° F. at the outlet end. A detailed description of the creeping bed regenerators hereinabove discussed appears subsequently and is illustrated in FIG. 3.

While the preferred process modification is to use the creeping bed regenerators to cool the gas stream from room temperature to a relatively cold temperature, it should be understood that other types of heat exchangers may be used and still be within the scope of this invention. If reversing heat exchangers were used, pressures up to about 3 atmospheres absolute might be necessary in order to obtain "self-cleaning" action. In this case the minimum operation temperature would be about −150° F. in order to prevent condensation of acetylene.

FIGURE 1 shows passage of acetylene-containing gas (intake stroke) through regenerator 11, blower 15 and regenerator 16 while regenerators 12 and 17 are being purged with process gas or air and recycled vent gas from the acetylene absorber 20. It is understood that the intake and purge strokes are periodically reversed so that acetylene-containing gas passes through regenerator 12, blower 15 and regenerator 17, while regenerators 11 and 16 are being purged. Means for providing this alternation of intake and purge strokes are well known to those skilled in the art.

For final clean-up, the acetylene-containing gas stream may be passed through a cold adsorbent trap 18 maintained at a temperature below about 32° F. to remove the last traces of diacetylene and some other higher acetylenes, such as methyl acetylene and vinyl acetylene. Some olefins such as allene are also removed. The trap is preferably maintained at a temperature below −40° F. and specifically at a temperature near that of the cold regenerator outlet temperature. Low temperatures are used in order to increase adsorptive capacity and also to prevent polymerization of the adsorbed impurities. Silica gel is a convenient adsorbent, but other known adsorbents such as activated alumina or activated charcoal can be used as well. A companion adsorbent trap 19 may also be used for continuous operation. One trap is regenerated by means of a cold vent gas stream, while the other is adsorbing. In the preferred form of this invention the adsorbent trap is designed to remove all the higher acetylenes, especially diacetylene. This bed can be reused since the adsorbed higher acetylenes do not polymerize and foul the adsorbent under the low temperature adsorption conditions used.

The cleaned gas from the cold adsorbent trap 18 then passes through line 46 to the main adsorber column 20 where cold solvent at a temperature below about −120° F. and a pressure of less than about 2 atmpsoheres absolute enters through line 26 and removes the acetylene and other soluble constituents. Typical operation is at about −139° F. and 6 pounds per square inch gauge (p.s.i.g.). Efficient liquid-gas contact in the absorber column is obtained by conventional means such as packing or trays. The acetylene is absorbed in the main section of the column 20 and goes out with the main solvent stream through line 21. The stripped vent gas stream from the top of the column 20 is recycled through line 22 to regenerator 17 to pick-up material adsorbed and condensed on the pebbles during the intake stroke and to recover the refrigeration in the stream. The vent gas in line 22 recycled to regenerator 17 is then divided inside the regenerator in order to maintain proper internal heat balance. The main portion of the gas passes through regenerator 17 and leaves through line 36. The remaining portion leaves regenerator 17 through line 37, passes through blower 38 and heat exchanger 42, and forms the cooling purge gas for adsorbent bed 19. The resulting purge gas returns to the main vent gas stream 36 through line 29. Proper heat balance conditions are maintained by line 41 and heat exchanger 42. An optional heat exchanger 23 may need to be interposed in line 22 to help balance the heat capacity of the gas streams in regenerators 16 and 17. This recycled gas in line 36 may then be added to the hydrocarbon stock prior to a cracking process if so desired. Heat of adsorption is removed from the main absorber column 20 by means of a refrigeration coil 24. A detailed description of the adsorbent bed hereinabove discussed appears subsequently and is illustrated in FIG. 4.

Acetone is the preferred solvent for the absorption step since it has high selectivity for acetylene at these low temperatures. Other solvents such as ammonia, dimethyl formamide, N-methyl-2-pyrrolidone and 3-butyrolactone may also be used if desired.

The main solvent stream in line 21, containing the acetylene in solution, exchanges heat in heat exchanger 25 with the stripped solvent stream returning from the solvent storage container 27 through pump 48, line 54 and line 26. The acetylene-rich solvent stream in line 21 is then preferably fed to a combination vent column and acetylene stripper column 28. In the upper section, between the feed point of line 21 and the top of the column, a stream of solvent from line 44 is used to scrub acetylene from the vent gases thus providing a vent gas stream rich in components less soluble than acetylene, such as carbon dioxide, hydrogen, methane and carbon monoxide. The vent gas stream is taken off overhead through line 29. In the middle section, between the feed point of line 21 and the acetylene discharge line 30, the solvent is stripped of components less soluble than acetylene by a small stream of gaseous acetylene from the bottom section of column 28 (not shown). In the bottom section below the acetylene discharge line 30, the solvent is stripped of acetylene by solvent vapor. The vapor is generated by boiling the stripped solvent at the bottom of the column with a steam-heated heat exchanger (not shown). The overall operation in column 28 is temperature-driven. The vent gas is obtained by a combination of temperature increase and purging by acetylene gas which, in turn, is obtained by purging of solvent vapor. The solvent vapor is also obtained by a temperature increase.

A portion of the stripped solvent, obtained from solvent storage 27 through line 44, is used as reflux in the vent column 28. The small amount of gas taken off overhead from the vent column in line 29 may be recycled to the main gas stream to recover its acetylene content or may be vented if desired.

Alternatively, two separate columns, a vent column (having the functions of the upper and middle sections of column 28) and a stripper column (having the function of the bottom section of column 28) may be used. The combination column, described hereinabove, is preferred.

An acetylene stream having a purity of about 99.5 percent is taken off as a side-stream from the vent column and acetylene stripper 28 through line 30 and forms the desired product stream. The stripped solvent from the bottom of this column is then returned to the solvent storage 27 through line 45 for re-use. It is understood that various engineering variations could be used to strip the acetylene from the main solvent stream leaving absorber 20. The above detailed process is the one presently preferred.

In another embodiment of the invention, shown in FIGURE 2, the adsorbent bed 18 may be designed to remove only diacetylene and not other higher acetylenes such as methyl acetylene. The methyl acetylene, which is generally more soluble in appropriate solvents than is acetylene, is then selectively absorbed in a preliminary absorber 31 prior to entering absorber 20 and is taken off in a bottom stream through line 32. This stream 32 containing methyl acetylene, solvent and a small amount of acetylene is purged of substantially all of its acetylene content in an acetylene recovery column 33. A portion of the vent gas, which has previously cooled the cold creeping bed regenerators 16 or 17, is diverted from conduit 37 to line 40 to purge this column, the gas then returns with its acetylene content to absorber 20 through line 34. The solvent and methyl acetylene from the bottom of column 33 are then passed through line 50 to a stripper column 35 for separation. The resulting stripped solvent is returned to solvent storage 27 through line 52.

FIG. 3 is an exemplary illustration of the creeping bed regenerators previously discussed in which a pair of regenerators are provided with pebble flow through the regenerative zone from the cold end to the warm end. The operation of the regenerators will be discussed in relation to the regenerator pair generally shown at 11 and 12 of FIGS. 1 and 2 but it should be understood that the discussion to follow applies equally well to the regenerator pair shown generally at 16 and 17 of FIGS. 1 and 2.

An acetylene-containing gas is introduced through conduit 110 and either of warm end reversing valves 111a or 111b to either regenerator 116 or 117, respectively, for cooling and cleaning therein. The acetylene-containing gas stream flows through the pebble bed 131 from the warm end 114a or 114b to the cold end 115a or 115b for cooling and resulting deposition of impurities in such bed. The cooled and partially cleaned acetylene-containing gas stream is discharged from the cold end 115a or 115b and passed through cold end check valve 117a or 117b, respectively, into conduit 130 for direction to a pair of cold operating creeping bed regenerators or to the adsorbent bed. While one of the creeping bed regenerators is on stream, i.e., cooling and cleaning the acetylene-containing gas, process gas or air is passed through the bed not on stream through conduit 113 as a cold purge gas stream. The latter flows through either of the cold end check valves 127a or 127b into the regenerator and passes through the packed bed 113 in a direction countercurrent to the previously flowing acetylene-containing gas stream. The pebbles are concurrently cooled by the purge gas which is discharged from the warm end 114a or 114b of the regenerator through warm end reversing valve 121a or 121b into conduit 120 for release to the atmosphere or is further processed. The acetylene-containing gas and purge gas flows are periodically switched between the regenerator pair 116 and 117 in a manner well-known to those skilled in the art. The pebbles are carried in conduit 124a and 124b through valves 140 and 141, respectively, to elevator 125 for transfer to the cold end of the regenerators. The cooled recycling pebbles are transferred from the elevator 125 through conduits 126a and 126b as well as control valves 142 and 143 to the cold ends 115a and 115b for passage therethrough.

This relatively low pressure, low temperature separation system reduces the large investment required in the usual separation systems for recovery of low concentrations of acetylene from acetylene-containing gases. It eliminates the large number of compressors required by prior art recovery methods which operated at higher pressures since, in the preferred form of this invention, only a relatively low pressure compressor is needed to force the acetylene-containing gases through the separation cycle. The use of low temperature solvent absorption at a relatively low pressure requires smaller amounts of solvent due to increased solubility of acetylene at the low temperature. The use of creeping bed regenerators provides a novel and convenient method for cleaning the acetylene-containing gas stream while also permitting low pressure, low temperature processing without excessive heat exchange costs. This improved process is especially useful for removing acetylene present in gas streams in low concentrations.

Referring now to FIG. 4, the cooled acetylene is introduced through conduit 151 to adsorption traps 118 or 119 at a pressure between 2–3 atmospheres and a low temperature such as −40° F., and is directed through branch conduit 152 and control valve 153 therein to trap 118 containing adsorbent bed 155. Alternatively, the crude acetylene stream may be introduced at a warmer temperature level and cooled to the desired adsorption temperature by contact with the cold adsorbent particles. The adsorbent material preferably has relatively large pore sizes, and silica gel, activated alumina, activated charcoal and certain natural and synthetic zeolitic molecular sieves are among the materials suitable for the present process. Silica gel is the preferred adsorbent material because of its high capacity, excellent adsorption-desorption characteristics, and low cost.

The unsaturated heavier hydrocarbons are removed from the crude acetylene stream on passage through adsorbent bed 155, and the resulting impurity-free acetylene containing stream is discharged therefrom through branch conduit 156 and control valve 157 therein to conduit 158 for passage to the main absorption column.

To insure a continuous supply of impurity-free acetylene containing gas, a second adsorption trap may be provided and piped in parallel with first adsorption trap 118 so that when one unit is on-stream, the other unit is being regenerated for further use. A suitable purge gas, for example vent gases from the main absorber may be supplied to conduit 159 at a low temperature such as −30° F. The purge gas is directed from conduit 159 through branch conduit 160 and control valve 161 for flow through second adsorption trap 119 in a direction countercurrent to the flow of the crude acetylene stream during the previous stroke when trap 119 was on-stream. During the purge stroke, the impurities are desorbed from the adsorbate and swept out of trap 119 in the purge gas which is discharged through branch conduit 163 and control valve 164 to conduit 165 for release to the atmosphere or further processing as desired. During at least the initial part of the desorption step, the second trap 119 is maintained at a relatively low temperature level by the cold purge gas so that substantially no polymerization occurs during desorption. This low temperature level may be maintained substantially constant during the entire desorption step. However, the temperature level during the latter part of the desorption step may be increased as the diacetylene and other impurities are removed since the rate of polymerization decreases with both temperature and concentration decrease on the adsorbent.

If desorption is effected at an appreciably warmer temperature level than the adsorption step, it may be desirable to provide external means for precooling the adsorbent bed to the preferred adsorptive temperature level so as to minimize polymerization during the initial stages of the adsorption stroke. To this end, coils 170 and 171 may be embedded in the adsorption traps and a suitable refrigerant such as fluorotrichloromethane may be directed therethrough to obtain the desired cooling. The refrigerant may be circulated in coils 170 and 171 in controlled quantities by flow through valves 170a and 171a, respectively, during any part of the adsorption and desorption strokes, if necessary, to maintain the proper temperature levels. To this end, a heating fluid such as steam may also be circulated through coils 170 and 171 in the same manner during the latter part of the desorption stroke to obtain the aforedescribed warmup.

At any desired intervals, for example when the adsorptive capacity of first trap 118 is reached, the flows are switched so that second trap 119 is placed on-stream for impurity adsorption therein. At the same time, first trap 118 is placed on purge for desorption of impurities therefrom. To effect these flow changes, crude acetylene inlet valve 153 in branch conduit 152 is closed and inlet valve 166 therein is opened. Simultaneously, valve 157 in branch conduit 156 is closed and valve 167 therein is opened. Also, valve 164 in purge gas discharge conduit 163 is closed and valve 168 therein is opened. Finally, valve 161 in purge gas inlet conduit 160 is closed and valve 169 therein is opened.

The adsorption bed for removal of higher acetylenes is preferred in that it eliminates the necessity for separate solvent towers to recover these impurities. Such towers are large and expensive since they must handle the entire acetylene-containing gas stream as well as the solvent. Low temperature adsorption is unique in that the beds can be reused since the adsorbed higher acetylenes do not polymerize at the operating conditions. The preferential removal of higher acetylenes by adsorption was also unexpected and has proved to be a useful feature of this invention.

What is claimed is:

1. Process for recovering acetylene from gas streams containing acetylene, condensable materials, non-condensable higher acetylenes, and other non-condensable materials which comprises: cooling said gas stream in a first cooling means to about room temperature to remove a portion of said condensable materials therefrom; further cooling said gas stream in creeping bed regenerators to about −120° F. to −160° F. under a pressure of less than about 3 atmospheres absolute to remove additional amounts of condensable impurities; contacting the cold gas stream with an adsorbent at a temperature below 32° F. to remove final amounts of condensable materials and at least some amounts of higher acetylenes; contacting the resultant partially purified gas stream at a temperature below about −120° F. and a pressure of less than about 2 atmospheres absolute with a solvent which selectively absorbs acetylene to separate the acetylene from some of the relatively less soluble impurities and from most of the substantially insoluble non-condensable materials in the gas stream; then venting the remaining relatively less soluble impuirties from the solvent; and thereafter recovering the acetylene from the solvent.

2. Process in accordance with claim 1 wherein said gas stream is cooled to about −120° F. to −160° F. in creeping pebble bed regenerators.

3. Process in accordance with claim 1 wherein said gas stream is contacted with silica gel adsorbent.

4. Process in accordance with claim 1 wherein said gas stream is contacted with acetone as a solvent.

5. Process for recovering acetylene from gas streams containing acetylene, higher acetylenes, condensable materials and non-condensable materials which comprises cooling said gas stream in a first creeping pebble bed regenerative heat exchanger to about room temperature in heat exchange with material selected from the class consisting of process gas and process air to remove a portion of said condensable materials therefrom, further cooling said gas stream in a second creeping pebble bed regenerative heat exchanger to about −120° F. to −130° F. in heat exchange with a cold vent gas stream to remove additional amounts of condensable materials, treating the acetylene-containing gas stream with an adsorbent at a temperature below −40° F. and substantially the same as the outlet temperature of said second creeping pebble bed regenerator to remove final amounts of condensable materials and substantially all of the higher acetylenes, contacting the resultant purified gas stream with a solvent at a temperature below about −120° F. and a pressure of less than about 2 atmospheres absolute, said solvent selectively absorbs acetylene and thereby separates the acetylene from some of the less soluble impurities and from most of the non-condensable in the gas stream, recycling said less-soluble and non-condensable materials as said cold vent gas stream for heat exchange in said second creeping pebble bed regenerative heat exchanger, then venting the remaining less soluble impurities from the solvent and recovering the acetylene from the solvent.

6. Apparatus for recovering acetylene from gas streams containing acetylene, higher acetylenes, condensable materials and non-condensable materials which comprises in combination creeping bed regenerators for progressively cooling said gas stream to about −120° F. to −160° F. under pressures of less than about 3 atmospheres to remove condensable impurities therefrom, adsorbent means for treating said gas stream at a temperature below 32° F. to remove final amounts of condensable materials and at least some amounts of higher acetylenes, means for contacting the resultant purified gas stream with a solvent at a temperature below about −120° F. and a pressure of less than about 2 atmospheres absolute to selectively remove acetylene from some of the less-soluble impurities and from most of the non-condensable materials in the gas stream, and means for venting the remaining less soluble impurities from the solvent and recovering the acetylene from the solvent.

7. Apparatus in accordance with claim 6 wherein said adsorbent means is silica gel.

8. Apparatus in accordance with claim 6 wherein said means for progressively cooling said gas stream consists of creeping pebble bed regenerators.

9. Apparatus for recovering acetylene from gas streams containing acetylene, higher acetylene, condensable materials and non-condensable materials which comprises in combination a first creeping pebble bed regenerator for cooling said gas stream to about room temperature to remove a portion of said condensable materials therefrom, means for circulating a purge gas selected from the class consisting of process gas and process air to said first creeping pebble bed regenerator for heat exchange with regenerator contents therein, a second creeping pebble bed regenerator for cooling said gas stream in heat exchange with a cold vent gas stream to about −120° F. to −160° F. under pressure of less than about 3 atmospheres absolute to remove additional amounts of condensable impurities, adsorbent means for treating the cold acetylene-containing gas stream at a temperature below 32° F. to remove final amounts of condensable materials and some amounts of higher acetylenes, solvent absorption means for contacting the resultant purified gas stream with a solvent at a temperature below about −120° F. and a pressure of less than about 2 atmospheres absolute to selectively absorb acetylene from some of the less-soluble impurities and from most of the non-condensable materials in the gas stream, means for recycling said less-soluble and non-condensable materials from said solvent absorption means to said second creeping pebble bed regenerator for heat exchange therein, and means for venting the remaining less soluble impurities from the solvent and recovering the acetylene from the solvent.

10. Apparatus for recovering acetylene from gas streams containing acetylene, higher acetylenes such as diacetylene and methyl acetylene, condensable materials and non-condensable materials which comprises in combination heat exchange means for progressively cooling said gas stream to about −150° F. to −160° F. under pressures of less than about 3 atmospheres to remove condensable impurities therefrom including substantially all of the diacetylene, adsorbent means for treating said gas stream at a temperature below 32° F. to remove final amounts of condensable materials and the remainder of the diacetylene, means for contacting the resultant purified gas stream with a solvent at a temperature below about −120° F. and a pressure of less than about 2 atmospheres absolute, constructed and arranged such that said solvent selectively absorbs acetylene and methyl acetylene and thereby separates them from some of the less-soluble impurities and from most of the non-condensable materials in the gas stream, means for separating the acetylene-rich portion of the solvent from the methyl acetylene-rich portion and venting the remaining less-soluble impurities from the solvent and means for recovering the acetylene from the solvent.

11. Process for recovering acetylene from gas streams containing acetylene, higher acetylenes, condensable materials and non-condensable materials wihch comprises progressively cooling said gas stream to about −120° F. to −130° F. under pressures of less than about 3 atmospheres absolute to remove condensable impurities therefrom, treating the cold gas stream with an adsorbent at a temperature below 32° F. to remove final amounts of condensable materials and substantially all of the diacetylene, contacting the resultant purified gas stream at a temperature below about −120° F. and a pressure of less than about 2 atmospheres absolute with a solvent which selectively absorbs acetylene and methyl acetylene and thereby separates them from some of the less soluble impurities and from most of the non-condensable materials in the gas stream, separating the acetylene-rich portion of the solvent from the methyl acetylene-rich portion, then venting the remaining less soluble impurities from the solvent and recovering the acetylene from the solvent.

References Cited by the Examiner

UNITED STATES PATENTS

| 1,894,763 | 1/33 | Eisenhut | 55—63 |
| 1,938,991 | 12/33 | Wulff | 62—17 |
| 2,679,540 | 5/54 | Berg | 183—115.6 |
| 2,834,431 | 5/58 | Fauser | 183—115.6 |
| 2,856,258 | 10/58 | Braconnier | 55—64 |
| 2,894,602 | 7/59 | Fauser | 183—115.6 |
| 2,930,682 | 3/60 | Henderson | 62—48 |
| 3,026,969 | 3/62 | Braconnier | 55—65 |

NORMAN YUDKOFF, *Primary Examiner.*

GEORGE D. MITCHELL, ROBERT O'LEARY,
*Examiners.*